June 4, 1968 M. JOYCE 3,386,649
PIVOTED INDICATOR FOR NEWSPAPER DELIVERY RECEPTACLE
Filed Sept. 20, 1967
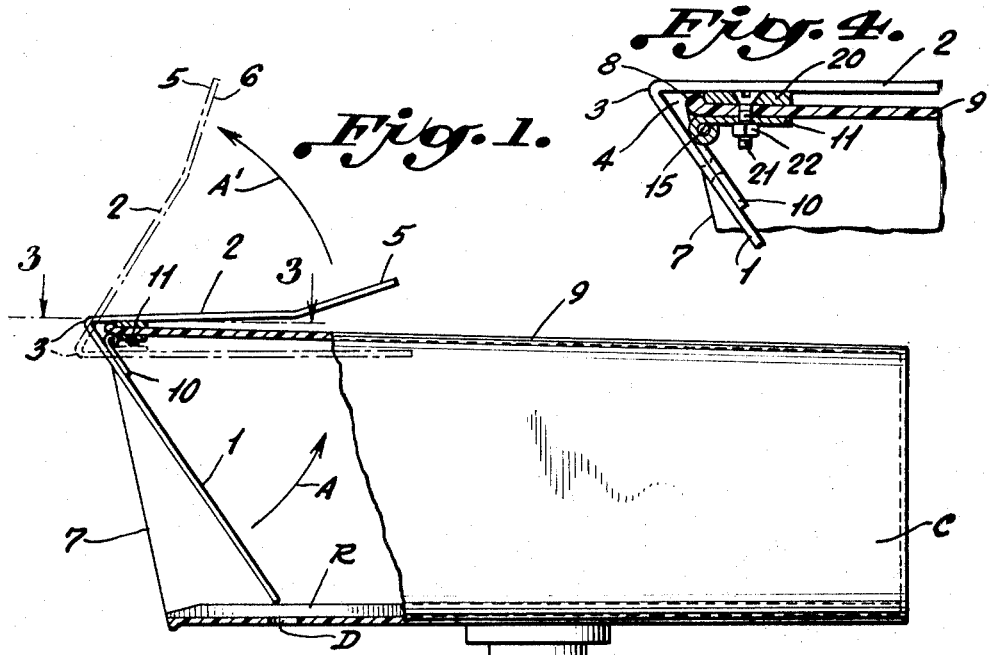
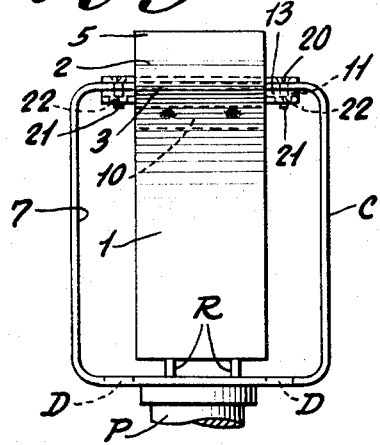
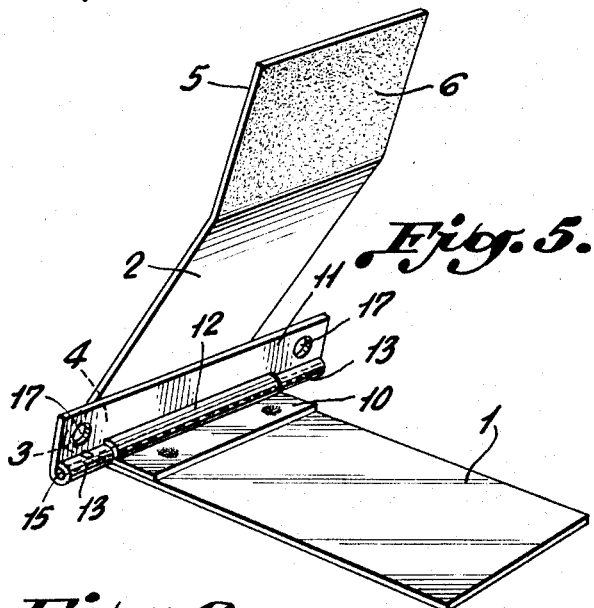
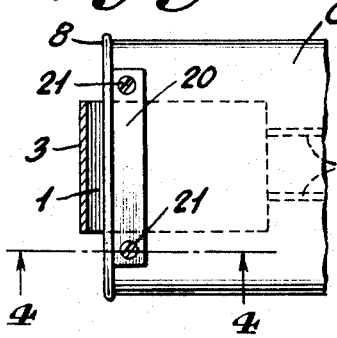
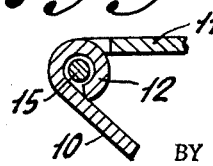
INVENTOR
MAURICE JOYCE
BY
*Samuel Klowtz*
ATTORNEY United States Patent Office 3,386,649
Patented June 4, 1968

3,386,649
PIVOTED INDICATOR FOR NEWSPAPER
DELIVERY RECEPTACLE
Maurice Joyce, 7054 Allentown Road, SE.,
Washington, D.C. 20031
Filed Sept. 20, 1967, Ser. No. 669,079
8 Claims. (Cl. 232—34)

ABSTRACT OF THE DISCLOSURE

The invention concerns a pivoted indicator or flag which is combined with a newspaper delivery receptacle for the purpose of automatically indicating the insertion of a newspaper into the receptacle. The indicator is formed of an integral plate having two arms bent at an acute angle with one shorter than the other. The shorter one is disposed externally of the top of the receptacle and is movable from a horizontal position when no newspaper is present in the container to an upstanding position when a newspaper is inserted thereinto. The plate is pivotally mounted on the upper wall of the receptacle through the intermediary of a simple straight strap hinge, one leaf of which is rigidly connected to said wall, while the other leaf is affixed to one of the arms so that the weight of the longer arm drops the latter into the path of the newspaper, which upon insertion moves the longer arm towards the upper wall and automatically swings the shorter arm to its upstanding indicating position.

---

This invention relates to a pivoted indicator for a newspaper delivery receptacle, of the type used in rural and like areas, when the receptacle is distant from a residence.

It is the object of the present invention to provide a rugged and reliable low-cost signal flag or indicator for a newspaper delivery receptacle which may be mounted easily thereon.

The pivoted indicator makes possible the insertion of the newspaper into the receptacle with minimum care and attention, and the automatic shifting of the signal flag into its indicating position, in a manner to display clearly, at a substantial distance therefrom, the presence of the newspaper in the receptacle.

It is another object of the invention to fabricate an indicator unit from simple sheet planar material which may be stamped and shaped at minimum cost, and to combine therewith a simple table or strap hinge of rectilinear outline, with one of the leaves thereof affixed to the indicator unit and the other leaf thereof affixed to the upper wall of the newspaper delivery receptacle, so that gravitational force alone will maintain the indicator in its inoperative position, and the insertion of the newspaper into the receptacle will automatically shift the unit to its position for indicating the presence of a newspaper into the receptacle.

It is another object of the invention to provide a flag indicator for newspaper delivery receptacles which may be fabricated separately at low cost and which may be either affixed to the receptacle at the time of manufacture of the latter or attached to existing receptacles with little cost and effort.

It is another object of the invention to provide a pivoted flag indicator for a newspaper delivery receptacle of rectangular cross-section which is simple, foolproof and inexpensive and which will withstand the rigors of adverse weather conditions, and rough handling which is an incident of the delivery of newspapers into receptacles in rural neighborhoods. Also the loose mounting of the flag on the pin of the hinge prevents the freezing of the latter against movement during cold weather. Specifically, the indicator unit is rigidly fastened to the receptacle for pivotal movement of the indicator member without any springs or analogous elements, which break down after a short period of time, as is the case with the device shown in U.S. Patent No. 2,553,164, May 15, 1951.

Other objects and purposes will appear from the detailed description of the invention following hereinafter, taken in conjunction with the accompanying drawings wherein FIG. 1 is a front elevation of a newspaper delivery receptacle with certain parts broken away to illustrate the mounting of a pivoted flag indicator at the front inlet end thereof;

FIG. 2 is a left end view of FIG. 1;

FIG. 3 is a horizontal sectional view along line 3—3 of FIG. 1;

FIG. 4 is a vertical sectional view, on an enlarged scale, along line 4—4 of FIG. 3;

FIG. 5 is a perspective view of the flag indicator in accordance with the invention which may be produced separately for attachment to a newspaper delivery receptacle, and FIG. 6 is a vertical sectional view across the central portion of the hinge.

In the drawings is shown a receptacle or container C mounted on a post P and into which is adapted to be inserted a newspaper when the same is delivered by a delivery truck and a runner who inserts a folded or coiled newspaper into the open end 7 of the container. This operation is executed rapidly, and it is desirable that when this is done, the presence of the newspaper within the receptacle be indicated to the recipient who may be a great distance from the receptacle. Therefore, it is important that the indictaor flag be operated easily by the insertion of the newspaper, and that it be readily visible to the recipient following this insertion.

The instant invention is adaptable for combination with newspaper delivery containers at the time of their manufacture, or the same may be marketed as an attachment which may be mounted on existing receptacles in the field, with the expenditure of minimum time and requiring no special skill.

The indicator flag in accordance with the invention is especially adaptable to containers which have come into general vogue in recent years, formed of plastic material and which are of general rectangular cross-section with rounded corners, and which have ventilating openings and moisture drain holes D, as well as ridges R extending longitudinally of the container, for the purpose of easily guiding the newspaper into the tubular container without marring or mutilating the newspaper.

The invention makes possible the fabrication and mounting of a flag indicator onto a newspaper delivery container which is simple, foolproof and inexpensive. It is essentially fabricated from a sheet or plate or material which is preferably formed of low gauge metal and which requires only the stamping and bending thereof into the general shape which is clearly illustrated in the perspective view shown in FIG. 5. The indicator plate may be a simple rectangular plate which is bent across an intermediate point 3 thereof to form an acute angle to divide the plate into two unequal portions 1 and 2.

As shown in FIG. 1 the larger portion 1 is designed to be disposed internally of the receptacle, while the smaller portion 2 is adapted to superpose the upper wall of the container, as shown in full lines in FIG. 1. A crotch 4, formed between the two portions at the bend 3 is adapted to have mounted therein a rectangular stub T-hinge formed of straps or leaves 10 and 11 provided with alternately arranged knuckles 12 and 13, respectively, through which extends the pivot pin 15. The strap 10 of the hinge is affixed to the inner face of the plate 1 and this may be done preferably by resistance welding. The companion leaf 11 of the hinge which is longer than leaf 10 and which extends beyond the opposite ends of the latter, is affixed to the top wall of the receptacle adjacent to the inlet opening, which is reenforced by an enlarged bead 8. As shown in FIGS. 1 to 4, this may be done by a retaining plate 20, of a size comparable to the hinge leaf 11, which plate is provided with apertures therein in alignment with apertures 17 in the leaf 11 and through which are adapted to pass bolts 21 and which together with nuts 22 serve to fasten the leaf 11 to the internal face of the upper wall 9 of the newspaper receptacle.

Of course, it is necessary that apertures be punched or cut in the upper wall 9 which coincide with the apertures in the retaining plate 20 and apertures 17 in the plate 11 to attain a securement of the parts.

The hinge leaf 11 may be fastened to the upper wall 9 in other ways. For example, the mounting plate 20 may be eliminated by the use of carriage bolts or bolts with large heads which rest directly upon the external face of the top 9 and which are designed to receive the nuts 22 at the lower ends thereof. Also, if desired, self-threading screws may be used which pass through the apertures in the mounting plate 20 and which pierce the top wall 9 and engage the openings 17 in the hinge plate 11 by a self-threading action.

While the knuckles 13 on the opposite ends of the hinge leaf 10 receive the pin or pintle 15 with normal clearance, the intermediate knuckle 12 is of enlarged diameter and embraces the pintle loosely. This prevents the hinge from freezing in cold weather, so that the portion 1 of the flag may always be moved by the insertion of the newspaper.

As shown in FIG. 1, the flag indicator normally assumes the position shown in full lines when the greater weight of the portion 1 is sufficient to dispose this portion internally of the receptacle at an inclination to the vertical. This portion 1 is constrained from movement to the vertical plane by the bottom of the receptacle, or, as shown in FIG. 1 by the lower edge of plate 1 striking against the ridges R. The insertion of a newspaper into the receptacle is in nowise impeded by the presence of the plate portion 1, and as the newspaper is guided into the receptacle, the portion 1 is swung towards the upper wall of the receptacle into a substantially horizontal position as shown in dotted lines, as indicated by the arrow A. This action serves to swing the external portion 2 upwardly in a counter-clockwise direction, as indicated by the arrow A′, so that the upstanding position of the flag 2 indicates the presence of a newspaper in the container.

In order to render the flag more readily visible from a great distance, the free end 5 of the plate may be bent from the main portion 2 at an obtuse angle, and the inner face 6 thereof may be colored distinctively so that the contrast of this portion 6 relative to the rest of the inner face of the portion 2 renders more clearly visible the upstanding position of the flag. The portion of the flag indicator between its operative and inoperative positions is executed reliably by virtue of the fact that a simple hinge and a weighted member are the only elements which are involved in the assembly. Because of the simplicity of the component parts, the indicator is capable of an effective, long and useful life over long periods of time under adverse weather conditions. Even under freezing conditions, the looseness of the hinge mounting at knuckle 12 assures the free operation of the flag indicator.

While the indicator member is preferably formed of metal, such as aluminum, any other weather-resistant material may be used, such as plastic sheeting.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:

1. In combination with a substantially horizontally disposed receptacle for the delivery of a newspaper, provided with an inlet opening for the latter at one end of the receptacle, means for indicating the presence of a newspaper in said receptacle comprising
    (a) a pivoted integral planar plate bent at an intermediate point thereof to form an acute angle between two unequal portions and a crotch portion therebetween, the smaller portion adapted to be disposed externally, and the larger portion internally, of the receptacle;
    (b) a hinge member composed of a pair of pivotally mounted leaves engaging a common pivot pin for relative rotary movement,
    (c) one of said leaves affixed to the inner face of one of said plate portions adjacent to the angular corner at said crotch portion,
    (d) the other one of said leaves adapted to be affixed to the upper edge of said receptacle adjacent to said inlet opening to dispose the larger portion of said planar plate by gravitational force only within the interior of the receptacle adjacent to said opening, at an inclination to the vertical, and with the free edge of said portion constrained from further movement by the bottom of said receptacle,
    (e) the smaller portion of said planar plate adapted to superpose the top of said receptacle in consequence of the preponderant weight of the portion within said receptacle beyond said hinge member; and
    (f) said last-mentioned portion adapted to be rocked upwardly from the top of said receptacle to an upstanding indicating position in response to the insertion of a newspaper into said inlet opening in the receptacle and the consequent tilting of said larger portion towards the upper wall of said receptacle.

2. A device as set forth in claim 1 wherein the upper wall of said receptacle is disposed in a substantially horizontal plane, and the hinge member adjacent to said inlet opening is rectilinear.

3. A device as set forth in claim 2 wherein the free end of said smaller external portion is bent outwardly from the plane of said portion at an obtuse angle, and the surface of said free end adjacent to the top of said receptacle is provided with a distinctive color ornamentation to render more visible the face of said smaller portion in its upstanding position.

4. A device as set forth in claim 2 wherein one of the leaves of said rectilinear hinge member is adapted to be fastened to the inner face of the upper wall of said receptacle adjacent to the edge of said inlet opening, and the other one of said leaves of said hinge member is welded to the inner face of said larger internal portion of said planar plate beyond said crotch portion.

5. A device as set forth in claim 4 wherein said first-mentioned one of said leaves of the hinge member is fastened to said upper wall of the receptacle by threaded means.

6. A device as set forth in claim 5 wherein the fastening means for the first-mentioned leaf of the hinge member comprises a retaining plate of a size comparable to said last-mentioned leaf provided with apertures in alignment with the corresponding apertures in said leaf, said retaining plate adapted to be disposed adjacent to the outer face of said upper wall, and said threaded fastening means adapted to interconnect and integrate said retaining plate and hinge leaf to the edge of the upper wall of said receptacle.

7. A device as set forth in claim 5 wherein said threaded fastening means comprises bolts adapted to pass through said apertures and corresponding openings in said upper wall, with retaining nuts therefor.

8. A device as set forth in claim 4 wherein said first-mentioned leaf of the rectilinear hinge member is longer than the other leaf which is welded to the larger internal portion and extends beyond the ends of the other leaf, knuckles provided on the ends of said first-mentioned leaf, a pintle extending through said knuckles, and a knuckle on said other leaf between said first-mentioned end knuckles fitting loosely on said pintle.

References Cited

UNITED STATES PATENTS

| 1,467,078 | 9/1923 | Webb | 232—45 |
| 1,904,448 | 4/1933 | Hampden et al. | 232—35 |
| 2,496,962 | 2/1950 | Shaw | 232—34 |
| 2,553,164 | 5/1951 | Bishop | 232—34 |
| 2,845,217 | 7/1958 | Jacques | 232—17 |
| 3,325,093 | 6/1967 | Echavarren | 232—43.1 |

FRANCIS K. ZUGEL, *Primary Examiner.*